(12) United States Patent
Kleppa et al.

(10) Patent No.: US 8,701,779 B2
(45) Date of Patent: Apr. 22, 2014

(54) BELLOWS VALVE

(75) Inventors: Erling Kleppa, Jørpeland (NO); Øyvind Stokka, Sandnes (NO); Ole Sevheim, Stavanger (NO)

(73) Assignee: Petroleum Technology Company AS, Stavanger (NO)

( * ) Notice: Subject to any disclaimer, the term of this patent is extended or adjusted under 35 U.S.C. 154(b) by 291 days.

(21) Appl. No.: 12/921,568

(22) PCT Filed: Mar. 13, 2009

(86) PCT No.: PCT/NO2009/000093
§ 371 (c)(1),
(2), (4) Date: Dec. 1, 2010

(87) PCT Pub. No.: WO2009/113875
PCT Pub. Date: Sep. 17, 2009

(65) Prior Publication Data
US 2011/0067879 A1    Mar. 24, 2011

(30) Foreign Application Priority Data
Mar. 13, 2008  (NO) .................................. 2008 1341

(51) Int. Cl.
*E21B 34/08*    (2006.01)
(52) U.S. Cl.
USPC ........... 166/326; 166/316; 251/45; 251/335.3
(58) Field of Classification Search
USPC ................... 166/316, 326; 251/45, 46, 335.3
See application file for complete search history.

(56) References Cited

U.S. PATENT DOCUMENTS

| 3,208,398 | A | 9/1965 | Douglas |
| 4,986,727 | A | 1/1991 | Blanton |
| 6,827,146 | B2 * | 12/2004 | Faustinelli ..................... 166/319 |
| 6,851,480 | B2 | 2/2005 | Swoyer et al. |
| 2003/0111231 | A1 | 6/2003 | Faustinelli |
| 2004/0182437 | A1 | 9/2004 | Messick |
| 2007/0227739 | A1 | 10/2007 | Becker |

FOREIGN PATENT DOCUMENTS

| NO | 20041144 A | 9/2004 |
| WO | WO2008/150179 P | 12/2008 |
| WO | WO2008/150179-X | 12/2008 |

\* cited by examiner

*Primary Examiner* — Yong-Suk (Philip) Ro
(74) *Attorney, Agent, or Firm* — Christian D. Abel

(57) ABSTRACT

The invention relates to a valve device that is used in oil and gas wells. The valve device has an external housing (1), where at least one inlet (4) in the housing (1) is connected to an outlet (5) through a longitudinal bore in the housing longitudinal direction. Between the valve device's inlet and outlet there is mounted a valve seat (2) in the bore, where a valve body (3) shuts off the connection between the inlet and outlet. The valve body's position is controlled by a support (20), connected with a pressure-sensitive bellows device (6) comprising an upper and a lower bellows element (7, 71). When the lower bellows element is compressed in the valve device's axial direction, the compression will cause the two bellows elements' impact elements to be moved relative each other in order to lift the valve body out of abutment with the valve seat.

14 Claims, 3 Drawing Sheets

BELLOWS VALVE

FIELD OF THE INVENTION

The present invention relates to a device which is typically used in connection with oil and gas wells with the object of assisting with start-up and initiation of production in a well, and more particularly the present invention concerns a pressure-controlled valve which is capable of operating within a predefined delta pressure range.

BACKGROUND

Hydrocarbons, such as oil, gas and/or mixtures thereof, are normally found in accumulations under pressure in porous formations in bedrock. These natural hydrocarbon reservoirs are exploited by drilling one or more boreholes down into the bedrock. When drilling of these boreholes is completed and the oil well is in production, various processing installations located on or above the seabed will be able to completely or partly process the hydrocarbons.

There are some oil wells where the natural flow of hydrocarbons to the surface is not sufficient to permit or maintain commercial production. This may be due, for example, to the hydrocarbons' viscosity and/or weight, or the fact that the pressure in the oil well is too low to counteract the hydrostatic pressure of the fluid in the well together with the counter-pressure exerted on the fluid in the oil well by the processing installations.

For such oil wells a number of systems and different principles have therefore been developed which can increase the oil wells' production by means of so-called artificial lifting. The two most commonly used systems today are water injection and gas injection. With gas injection natural gas under high pressure is injected into the annular space between the casing and the tubing. For this purpose a pressure-controlled valve, a so-called gas lift valve, is usually employed in order to be able to supply and control or check the amount of gas flowing into the actual tubing.

Pressure-controlled valves of this kind can also be used during a well start-up phase, where completion fluid can be found in both the well's annulus and in the tubing. In order to start production in such a well, completion fluid must be displaced from the annulus, through one or more pressure-controlled valves, and up to the surface through the tubing.

Another similar area of application will be after a well shut-in, where fluid has filled up at least parts of the annulus or where production fluid has lain for some time and gas has migrated to the surface and where the pressure in the well is too low for the well to begin producing without receiving pressure support from gas injection.

How these pressure-controlled valves are configured and located in the well will depend on a number of parameters. For example, according to the tubing's size (diameter) and the injection pressure available, so-called gas injection points will be provided at one or more points in the tubing, whereby the specific configuration arranges for an optimal gas injection. The pressure-controlled valves, such as a gas lift valve, will then be installed in these gas injection points at the same or different depths in the tubing's longitudinal direction, with the object of initiating gas injection, thereby achieving an artificial lifting in the well.

The gas lift valve(s) can then be controlled or checked according to several different principles, for example by a pressure, where it is the pressure differential round and/or across the valve which permits a controlled opening or closing of the valve.

SUMMARY OF THE INVENTION

An object according to the present invention is therefore to provide a device for controlling the injection of a fluid into tubing.

Another object of the present invention is to provide a device which can be connected to a gas lift valve and thereby used for controlling the gas injection in the oil and/or gas well.

Yet another object of the present invention is to provide a device which is capable of operating within a predefined pressure area.

A further object of the present invention is to provide a device which can be opened or closed at a given pressure difference between two fluids.

These objects are achieved with a device as indicated in the following independent claim, where further features of the invention will become evident from the dependent claims and the description below.

A valve device according to the present invention is particularly intended for use in connection with a start-up phase in an oil well, where both the annulus and the tubing will be filled with, for example, completion fluid. Before oil production can start up in such a well, the completion fluid located in the well's annulus must be displaced and replaced with injection gas. This is accomplished by pumping natural gas or nitrogen under high pressure into the annulus between the well's casing and the tubing, where one or more pressure-controlled valves arranged along the tubing will open the way for through-flow of the pressurised gas and completion fluid from the annulus into the tubing. As completion fluid flows through the valves and into the tubing, gas or nitrogen under pressure must be supplied to the annulus until all the completion fluid is displaced into the tubing. The well can then start production.

It should be understood, however, that the valve device according to the present invention may also have other areas of application, for example in oil and/or gas wells where the well does not have sufficient pressure to force the hydrocarbons up to the surface, or during a start-up of a well which has been temporarily shut down, where fluid has filled up at least parts of the annulus or where production fluid has lain for some time and gas has migrated to the surface and where the pressure in the well is too low for the well to begin producing without receiving pressure support from gas injection.

The present invention relates to a valve device comprising an external housing, where at least one inlet in the external housing is connected with at least one outlet through a longitudinal bore in the housing's longitudinal direction. Between the inlet and the outlet, moreover, a valve seat is arranged in the housing's longitudinal bore, and a valve body is placed in the valve seat. When the valve body abuts the valve seat, it will not shut completely for a connection between the valve's inlet and outlet. This "leakage" across the valve seat will cause a hydraulic locking of the valve to be avoided. The valve's inlet may furthermore be so arranged on the valve device that when the device is attached to or mounted in the tubing, the inlet will be in contact with an annulus of the well, while the outlet on the valve device may be so arranged that it is located inside the actual tubing. With a sufficient amount of pressure the valve body will be lifted from the valve seat, thereby forming a connection between the valve's inlet and outlet, and thereby enabling pressurised gas and/or other fluid to flow from the annulus, across the valve device and into the tubing. It will be understood that both the valve's inlet and outlet have to be connected to a fluid-filled space. In a preferred embodiment the valve device's outlet will be provided in such a manner that outflow of fluid through the outlet occurs in the valve's axial direction.

One of the valve device's end terminations is provided with a through-going hole, where this hole forms a connecting point for a hydraulic supply line. The supply line is employed for adding a pressurised fluid to the inside of the external housing.

The valve device may also be envisaged connected or joined to other units, for example a gas lift valve. In this case the valve device's outlet will be connected to the gas lift valve's inlet. How this connection may be formed will be known to a person skilled in the art and will not be described further here.

The valve device's housing may be manufactured in a single piece, or it may be composed of several part elements, which together will form the external housing.

According to the present invention a pressure-sensitive bellows device is arranged in the valve device's longitudinal bore. The bellows device may, for example, be in the form of a double bellows element, where the bellows elements are permitted to move in both the axial and radial directions when subjected to an external influence. This is achieved by the bellows elements being arranged in the longitudinal bore in the external housing. The bellows elements will then have a radial dimension which is less than the longitudinal bore's dimension when viewed in the longitudinal bore's longitudinal direction. The result of this is that in an embodiment the bellows elements are encircled by a volume (which is circumscribed by the bore's diameter and the bellows elements' dimension), where this volume through an inlet is in fluid connection with a first fluid, for example a pressurised fluid located in the well's annulus. Since the pressurised fluid is permitted to flow into the bore through the valve device's inlet, the bellows elements will be encircled by the fluid and moreover subjected to the pressure the fluid has. The pressure will thereby be able to influence the position of the bellows elements.

The bellows elements are arranged in the valve device in such a manner that they form an upper and lower bellows element.

A bellows element in the pressure-sensitive bellows device is preferably composed of a number of composite sections or discs. It is also conceivable that a bellows element may be manufactured by machining, casting etc. Furthermore, the bellows elements are made of a metallic material, but they may also be made of a non-metallic material, an elastomer material or a composite material. In some cases, moreover, a bellows element may be made of different materials.

Each of the bellows elements contains an incompressible fluid and must therefore be designed as a closed unit. This may be implemented in several different ways, for example by one bellows element being circumscribed and closed at one end by an impact element (dart), while the bellows element's opposite end is attached to an attachment piece. In this case the attachment piece may be provided with threads over a part of its length, thereby enabling the part, together with the bellows element, to be securely screwed inside the valve device's housing.

In a similar manner to the first bellows element, the second bellows element may be circumscribed and closed at one end by an impact element (dart), while the opposite end may be connected via a connecting rod to a valve body.

In a preferred embodiment of the invention the bellows elements are connected with a support device, where the bellows elements and the support device together form the pressure-sensitive bellows device.

Alternatively, the bellows elements may be designed as separate, independent units, where the impact element (the dart) is manufactured as an integrated part of the actual bellows element; the actual bellows element may also be manufactured as a separate closed unit, whereupon the bellows element is connected with an impact element (dart) in a suitable manner.

In a preferred embodiment of the present invention the bellows elements have a cylindrical shape, but they may also be provided in other geometrical shapes, for example a square, rectangular or oval shape. The bellows elements may furthermore be designed to contain the same or a different fluid volume.

Since it is desirable in this arrangement to have a bellows device which works within a predefined working area, the bellows elements are mounted internally in the housing's bore in such a manner that the support forms a boundary (end stopper) for the movement the upper and lower bellows elements respectively are permitted to perform. This means that if the upper bellows element is subjected to a pressure which causes the bellows element to be compressed in its axial compression direction, the support, i.e. the end stopper will prevent a further extension of the lower bellows element from occurring. Similarly, when the pressure on the upper bellows element diminishes, the lower bellows element will be permitted only a certain degree of travel in its axial compression direction before the bellows element's movement is stopped by the end stopper, thereby preventing the upper bellows element from being further extended.

In a preferred embodiment this end stopper may be a sleeve extending on the inside of the bellows element and in the bellow element's axial direction, where the end stopper is mounted in the support. The end stopper may be mounted in each of the bellows elements or only one bellows element.

In addition a "wall" may also be provided to restrict the bellow elements' radial movement, where this may be accomplished, for example, by the wall being provided in the volume circumscribed by the bore's diameter and the bellows element's dimension. This "wall" may, for example, be a sleeve which is attached in a suitable manner to the support at one end and the valve's end termination at its other end.

The support of the bellows device may be arranged in several different ways, but in a preferred embodiment the support consists of a closed cylinder disposed in the longitudinal bore in the external housing, where a through-going hole is provided in the top and bottom surfaces of the closed cylinder for connection to a bellows element. The bellows elements are arranged in such a manner that the bellows elements' impact elements (darts) are facing each other.

The impact elements are furthermore designed so as to form a sealing connection with the closed cylinder in the cylinder's axial direction, through a sealing system, for example by means of gaskets etc. The impact elements will furthermore be designed so as to form a metal-to-metal seal when they are brought into abutment with the holes provided in the top and bottom surfaces of the closed cylinder.

In a preferred embodiment of the present invention one or both bellows elements are designed in such a fashion that when a desired compression of the bellows element has been achieved, the bellows element will be completely compressed, thereby preventing a further compression of the bellows element from being achieved. This means that in its maximum compressed position, the bellows element will appear as a solid, fixed element, thereby giving the bellows element great mechanical strength and pressure resistance.

In the volume circumscribed by the bore in the external housing and the bellows element, one of the solutions according to the present invention may be that at each bellows element a nitrogen pack is provided which is pressurised, where the nitrogen pack represents a pre-tensioning which has to be overcome to enable the bellows elements to be influenced. Alternatively, the nitrogen pack may be replaced, for example, by cup springs or similar elastic devices. The nitrogen packs or the elastic devices for each of the bellows elements may have similar or different spring characteristics (moduli of elasticity).

The bellows elements' impact elements, which are mounted internally in the support, i.e. in the closed cylinder, will then form a "floating piston". The floating piston (the impact elements) will thereby be permitted to travel in the predefined working area for the bellows device, whereby the floating piston is stopped by the support when it comes into contact with it. The impact elements will be provided with a gasket system which prevents the incompressible fluid located on one side of the impact element from flowing over the impact element and landing on the other side. Furthermore, on the side facing the hole in the closed cylinder's top and bottom plates, each impact element will be designed so that the impact element together with the hole form a metal-to-metal seal. In an alternative embodiment of the present invention the bellows elements are connected at one end to the attachment piece and the impact element respectively, while their opposite ends will be connected in an appropriate manner with the hole in the closed cylinder's top and bottom plates, whereby this configuration forms a bellows device where the upper and lower bellows elements are interconnected through the closed cylinder. The above-described impact elements are mounted internally in the closed cylinder, which impact elements form the "floating piston".

The internal volume of the bellows device, which is circumscribed by the upper and lower bellows elements and the closed cylinder, contains an incompressible fluid.

Below the lower bellows element a guide element is provided, where the guide element is designed with a through-going hole for receiving a connecting rod which is connected at one end with the lower bellows element and at its opposite end with a valve body. The guide element is designed to support and control the connecting rod, so that the valve body ends in the correct abutment with the valve seat. The guide element moreover is designed so as to permit a flow through it, thereby enabling the surrounding fluid flowing through one or more inlets to reach the lower bellows element.

In an alternative embodiment of the valve device an annular element is disposed and fixed internally in the external housing's longitudinal bore. The bellows device's bellows elements are fixed (glued, welded etc.) on each side of the annular element, with the result that the bellows elements together with their end terminations form a closed bellows device. A so-called stopper, for example in the form of a sleeve extending for a certain length in the valve device's axial direction, is mounted internally in the bellows device. The stopper is connected in a suitable manner to the annular element. The stopper is intended to limit the bellows device's axial compression, and when the maximum compression of a bellows element has been reached, it will furthermore help to form a "solid" bellows element with great mechanical strength and pressure resistance. A stopper which can restrict the bellows device's radial expansion may also be mounted in the valve device. In this case the stopper is mounted internally in the external housing's longitudinal bore. An impact element which is mounted internally in the bellows device will restrict the contraction/expansion of the bellows elements.

The impact element may be in the form of a plate which is arranged so as to be able to move freely in a predefined working area.

According to a third embodiment of the valve device, a sleeve is connected to the interior of one bellows element of the bellows device. The sleeve will furthermore have a length which will permit it to extend through the annular element when the bellows element with which it is connected has its maximum extension.

The sleeve preferably has a cylindrical shape, but may also be provided in other geometrical shapes, such as a square, rectangular or oval shape. Through its connection with the bellows element and an end termination, moreover, the sleeve will form a closed chamber.

A number of through-going holes are provided in the sleeve, where the holes are arranged at a distance apart in the sleeve's axial direction. The holes will be placed relative to one another in such a manner that both holes will be located on one side of the annular element O when the bellows element in which the sleeve is disposed has its maximum extension (the valve device is then closed). This position is achieved when the bellows element which does not contain the sleeve is influenced by a pressure (either by the pre-tensioning device or by fluid being supplied in the valve device's bore). The bellows element will then begin to be compressed, thereby forcing the incompressible fluid to flow from one bellows element to the other through the holes. As fluid flows across from one bellows element to the other, the bellows element containing the sleeve will be extended in its axial direction. When this bellows element finally has become so extended that the valve body is brought into abutment with the valve seat, the valve device is thereby located in its closed position. During this process the sleeve will follow the bellows element's movement, and finally the sleeve will have moved so much relative to the annular element O that both holes will be located on the lower side of the annular element O. A further flow of fluid between the bellows elements will then not be possible. Since the bellows element containing the sleeve is subjected to a high external pressure when the valve device is mounted in a well, this bellows element will begin to be compressed. The sleeve will follow the bellows element's movement, thereby causing the sleeve to be moved through the annular element O again. After a certain compression of the bellows element the sleeve 27 will have moved so much that at least one hole is located on each side of the annular element O. In this position the incompressible fluid will be able to flow between the bellows elements again, and this flow will cause a "balance" to be achieved between the two bellows elements (the pressure is equalised). In this position the valve device is in its open position.

The valve device according to the present invention may also comprise locking and sensor devices, which locking devices will be able to lock the valve device in a desired position between the valve device's two extreme positions, where these two extreme positions constitute the valve device's closed and open positions. The valve device will then, for example, remain in the locked position until the locking device is influenced for opening, which may occur, for example, after the sensor device has measured a certain surrounding pressure. The locking device may, for example, be electrical, electromagnetic etc.

It is also conceivable that, instead of being influenced by a pressure from a surrounding fluid, at least one of the bellows elements is influenced by an activating mechanism. In this case the activating mechanism may be designed to transfer or apply a force to the bellows element, thereby causing the bellows element to be compressed or extended in its axial direction. The activating mechanism may, for example, be composed of a "worm transmission", hydraulic cylinder or the like, where the activating mechanism is controlled electrically, hydraulically, etc.

Other advantages and special features of the present invention will become apparent from the following detailed description, the attached figures and the following claims.

BRIEF DESCRIPTION OF THE DRAWINGS

The invention will now be described in greater detail with reference to the following figures, in which.

DETAILED DESCRIPTION

The figures illustrate different embodiments of the valve device according to the present invention, where the valve device is intended to be installed in tubing. A person skilled in the art will understand how this is done and it is therefore not covered in the description.

Figure 1:
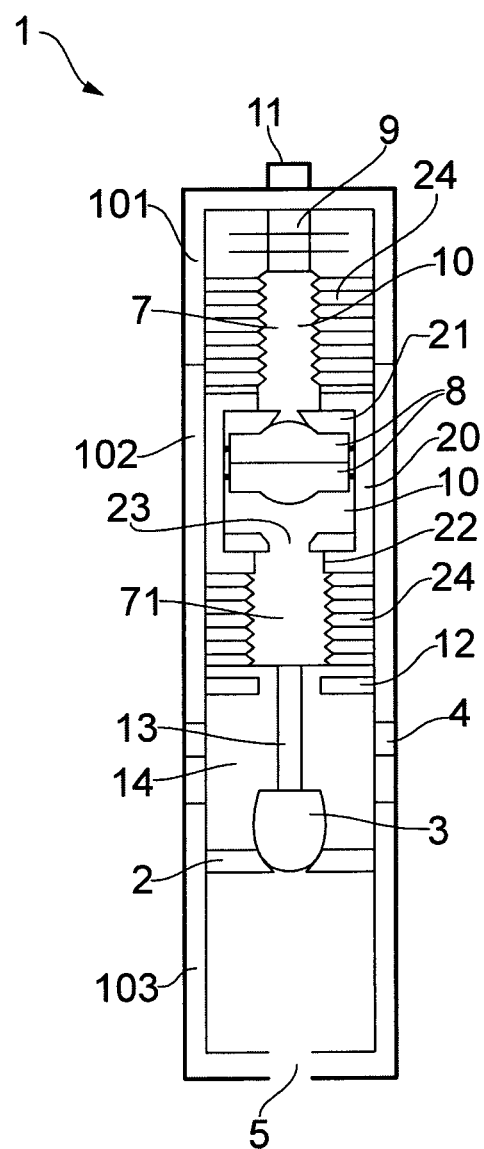
FIG. 1 is a longitudinal cross section of a first embodiment of the valve device according to the present invention.
Figure 2:
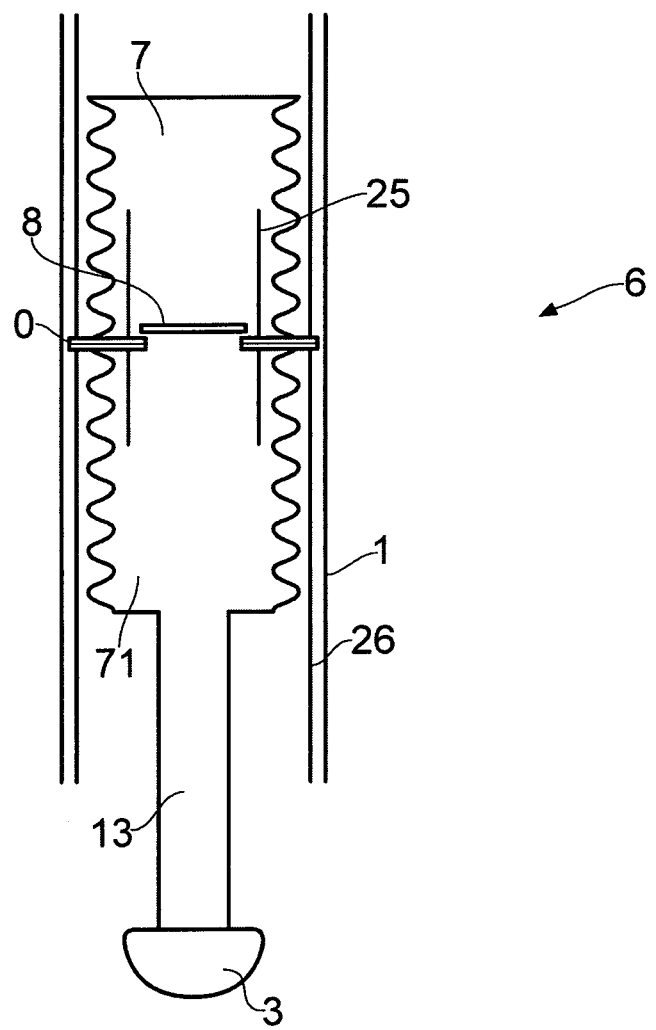
FIG. 2 is a longitudinal cross section of a second embodiment of the valve device according to the present invention.

FIGS. 1 and 2 illustrate the main components in the valve device according to the present invention. The valve device is depicted as a gas lift valve, comprising an external housing 1, which external housing 1 is composed of several part elements 101, 102, 103. The external housing 1 will furthermore be provided with an internal cavity. At one end of the housing 1 an internal valve seat 2 is arranged, which valve seat 2 is adapted for cooperation with a valve body 3. In a closed state of the gas lift valve the valve body 3 will therefore abut against the valve seat 2, as illustrated in FIG. 1. The valve seat 2 and the valve body 3 are designed in such a manner that when the valve device is located in a closed position, there will be a certain leakage between the valve seat 2 and the valve body 3. This non-sealing connection will prevent a hydraulic locking of the valve device. However, since the valve body 3 can be moved axially in the external housing 1, the valve body's 3 position can be changed to a position where the valve body 3 is lifted out of abutment with the valve seat 2, thereby forming a fluid connection between an inlet 4 and an outlet 5 of the gas lift valve. The inlet 4 is composed of one or more through-going holes in the gas lift valve's circumference, while the outlet 5 is arranged to have an axial flow out of the gas lift valve. The figures further show that the gas lift valve's inlet 4 and outlet 5 are arranged on each side of the valve seat 2.

Internally in the external housing 1 a pressure-sensitive bellows device 6 is provided comprising a double bellows element 7, 71. The upper bellows element 7, as illustrated in the figure, is connected to an impact element 8. At the end opposite the impact element 8 the bellows element 7 is attached by means of an attachment means 9 to the part element 101. This causes the bellows element 7 with the impact element 8 and the attachment means 9 to form a closed cavity 10, which cavity 10 is filled with an incompressible fluid. The bellows element 7 may, for example, be accordion-shaped, thereby permitting the bellows device 6 to move in its axial direction when influenced by a force. In the external housing 1 there is also provided at least one through-going hole 11, which hole 11 connects the exterior and interior of the housing 1. The through-going hole 11 forms a connecting point for a hydraulic supply line (not shown), which supply line is used for supplying a fluid to the inside of the external housing. The fluid may also be under pressure. When the pressure from the external fluid is so great that it influences the bellows element 7, the bellows element 7 will be subjected to a radial influence, and since the bellows element 7 is filled with an incompressible fluid, when it is compressed by a radial movement the bellows element 7 will be expanded in its axial direction. The bellows device 6 also comprises a lower bellows element 71, one end of which is connected to a connecting rod 13. At its opposite end the bellows element 71 is connected to an impact element 8.

The upper and lower bellows elements 7, 71 are connected to a support, which support comprises a closed cylinder 20 which is mounted and attached by means of suitable attachment devices internally in the external housing 1. In the closed cylinder's 20 top and bottom plates 21, 22, a hole 23 is provided for passing through the bellows elements 7, 71. The bellows elements 7, 71 will then be arranged in such a manner that the bellows elements' 7, 71 impact elements 8 are facing each other.

A guide element 12, for example in the form of a plate, is mounted internally in the external housing 1, where the guide element is mounted below the bellows element 71. The guide element 12 helps to support and guide the connecting rod 13, thereby ensuring that the valve body 3 is correctly located in the valve seat 2. The guide element 12 may be of such a shape that it does not cover the whole of the internal cavity, since fluid, which is located on the outside of the valve device and is flowing into the valve device's cavity through an inlet opening 4, must be able to influence the lower bellows element 71.

Round the upper and lower bellows elements 7, 71, moreover, nitrogen packs or springs 24 are provided, these having a desired pre-tension which has to be overcome before the bellows elements 7, 71 begin to be influenced.

The gas lift valve opens for fluid connection between inlet 4 and outlet 5 by the valve body 3 being moved out of abutment with the valve seat 2. This is achieved by pressure differential between the fluid located in the internal closed space 14 and the fluid located in the bellows device 6. Since the pressure of the fluid located in the internal closed space 14 is greater than the pressure in the bellows device 6, the fluid surrounding the bellows element 71 together with the nitrogen pack 24 will compress the bellows element 71 in the axial direction. On account of its incompressibility, the bellows element 71 will push the impact element 8 inwards into the closed cylinder 20, thereby compressing the bellows element 71. This results in the connecting rod 13, which is connected to the lower bellows element 71, following the compression of the bellows element, thereby causing the valve body 3 to be brought out of abutment with the valve seat 2. The result of this is that fluid which has flowed into the external housing's 1 cavity 14 through the inlet 4 can flow across the valve seat 2, on through the gas valve in the gas lift valve's axial direction, and finally out into the tubing through the outlet 5.

FIG. 2 illustrates a second embodiment of the pressure-sensitive bellows device 6 and the design thereof in greater detail. For the sake of simplicity, the rest of the elements of the valve device are omitted. Here it can be seen that the bellows device 6 is depicted as a separate unit, comprising a bellows element 7, 71. The bellows elements 7, 71 are mounted (glued, welded, etc.) on each side of an annular element O, with the result that the two bellows elements 7, 71 with their end terminations form a closed unit. The annular element O will be wider than the thickness of the bellows, so that a part of the annular element O will "protrude" on each side of the bellows. The bellows device 6 is mounted internally in the external housing 1 through the annular element O. On each side of the part of the annular element O which extends on the inside of the bellows element 7, 71, internal stoppers 25 will be mounted, in order to prevent a further axial compression of the bellows elements 7, 71. In the illustrated embodiment stoppers 25 are composed of a sleeve which extends in the valve device's axial direction. The length of stoppers 25 is such that the bellows element 7, 71 will be completely compressed when it comes into contact with the stopper 25, with the result that in this position the bellows element 7, 71 will be a solid, fixed element with great mechanical strength and pressure resistance. Stoppers 25 moreover will prevent a radial compression of the bellows element 7, 71.

On the outside of the bellows elements 7, 71, i.e. between the longitudinal bore in the housing 1 and the bellows elements 7, 71, an external stopper 26 is mounted. The external stopper 26 is a sleeve which is mounted internally in the longitudinal bore, whereby the external stopper 26 will limit the bellows elements' 7, 71 extension in the radial direction.

If, for example, the fluid, located in the longitudinal bore in the valve device and encircling the bellows element 71 has a pressure which is great enough to compress the bellows element 71 in its radial direction, the bellows element 71 will be compressed in the valve device's axial direction until a predetermined point on the bellows element 71 comes into contact with stoppers 25. A further influence on the bellows element 71 will not cause the bellows element 7 to be further compressed. In a similar manner, the bellows element's 7 travel will also be stopped. This embodiment will result in the formation of a predefined working area for the valve device, where the opening and closing of the valve can be precisely controlled. In addition major, unforeseen pressure will not influence the bellows element 7, 71 in such a manner that it or they will be exposed to an excess influence, which can cause the bellows element 7, 71 to tear, break, etc.

Internally in the pressure-sensitive bellows device 6 there is mounted a "floating" impact element 8. The impact element 8 may, for example, be in the form of a plate and is preferably provided with at least one through-going hole. Under the influence of an external pressure, the "floating" impact element will be arranged so that it can move freely in a predefined working area in the pressure-sensitive bellow device's 6 axial direction. The support (the annular element), however, will restrict the floating impact element's 8 movement. The impact element 8 will then form a metal-to-metal seal with the annular element, and the bellows elements' further movement will be stopped.

Figure 3:
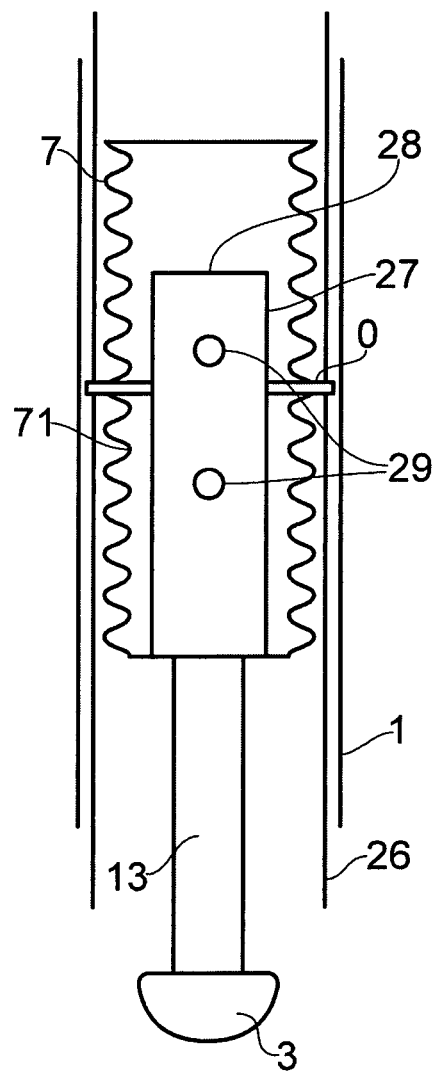
FIG. 3 is a longitudinal cross section of another embodiment of the valve device according to FIG. 2.

In FIG. 3 an alternative embodiment of the valve device according to FIG. 2 is illustrated, where a sleeve 27 is provided in the bellows device 6. The sleeve 27 is closed at one end by a plate 28, and at its other end the sleeve 27 is connected with the bellows element 71, on the inside thereof, with the result that the sleeve 27 forms a closed container. The sleeve 27 may be connected to the bellows element 71 by welding, gluing or in some other suitable manner.

The sleeve 27 preferably has a cylindrical shape, but may also be provided in other geometrical shapes, such as a square, rectangular or oval shape. The sleeve 27 will furthermore have a length which permits it to extend through the annular element when the bellows element 71 has its maximum extension, i.e. when the valve device is closed.

Since the sleeve 27 is connected to the bellows element 71, the sleeve 27 has to be slidably connected to the annular element O, thereby causing the sleeve 27 to be moved through the annular element O when the bellows element 71 is compressed or extended due to influence from the bellows device 6. Between the sleeve 27 and the annular element O a sealing device may be provided, thereby preventing the incompressible fluid in the bellows device 6 from flowing over the annular element O.

In the sleeve 27 at least two through-going holes 29 are provided, where the holes 29 are arranged at a distance apart in the sleeve's 27 axial direction. The holes 29 will be placed in such a manner relative to each other that both holes 29 will be located on one side of the annular element O when the bellows element 71 is located in its maximum protruding position (the valve device is then closed). This position is achieved when the bellows element 7 is influenced by a pressure (either by the pre-tensioning device 24 or by the addition of fluid). The bellows element 7, which is subjected to greater pressure than the bellows element 71, will then begin to be compressed, whereby the incompressible fluid will flow from the bellows element 7 over into the bellows element 71 through the holes 29. As fluid from the bellows element 7 flows over to the bellows element 71, the bellows element 71 will be extended in its axial direction. Bellows element 71 has finally become so extended that the valve body 3 is brought into abutment against the valve seat 2, whereby the valve device is in its closed position. During this process, the sleeve 27, which is connected to the bellows element 71, will follow the bellow element's 71 movement, and finally the sleeve 27 will have moved so much relative to the annular element O that both holes 29 will be located on a lower side of the annular element O. A further flow of fluid from bellows element 7 to bellows element 71 will then not be possible. Due to the fact that, when the valve device is mounted in a well, the bellows element 71 is exposed to a high external pressure, bellows element 71 will begin to be compressed. The sleeve 27 will follow the bellow element's 71 movement, thereby causing the sleeve 27 to be moved through the annular element O again. After a certain compression of bellows element 71, the sleeve 27 will have moved so much that at least one hole is located on each side of the annular element O. In this position the incompressible fluid will be able to flow from bellows element 71 over to bellows element 7, with the result that this flow will cause a "balance" to be achieved between the two bellows elements 7, 71 (the pressure is equalised). In this position the valve device is in its open position.

For the sake of simplicity only the specific features at and round the valve device's bellows device 6 are illustrated in FIGS. 2 and 3, but it will be appreciated that the valve device must also include other elements which are described in relation to FIG. 1.

The valve device's mode of operation will now be explained with regard to the embodiment illustrated in FIG. 1. Through a supply line connected to the through-going hole 11, a fluid under pressure is supplied to the area round the bellows element 7. This pressure is controlled from outside, and the magnitude of this pressure will depend on the valve device's area of application. The pressure in the well's annulus will be increased simultaneously, with the result that the fluid encircling the valve device will flow into the longitudinal bore through the inlet 4. When the pressure of this fluid is sufficiently great to overcome the bias in the nitrogen packs or the springs 24, as well as the counter-pressure created in the closed cylinder 20, the bellows element 71 will be influenced so that it is compressed in its axial direction. On account of the incompressible fluid in the closed cavity 10, the bellows element 71 will then move the impact element 8 upwards internally in the closed cylinder 20. After a certain compression of the bellows element 71, the valve body, which is connected to the bellows element 71 via the connecting rod 13, will be lifted out of abutment with the valve seat 2, thereby permitting fluid to flow through the inlet 4, through the valve and out of the outlet 5.

Only elements relating to the invention are explained and described above and a person skilled in the art will understand that the external housing may be designed as one unit or it may be composed of several connected elements. The valve device should furthermore have suitable devices for connection or mounting in a process fluid flow. A skilled person will furthermore appreciate that several versions and modifications of the described and illustrated embodiment may be provided within the scope of the invention as defined in the attached claims.

The invention claimed is:

1. A valve device for use in an offshore or onshore oil well, comprising:
    a housing with an inlet and an outlet, where the inlet and the outlet are connected via an internal longitudinal passage;
    a valve seat and a valve body which controls the flow of a first fluid through the internal longitudinal passage;
    and a pressure-sensitive device; characterised in that the valve device comprises a support which is fixedly mounted inside the housing and in that the pressure-sensitive device comprises;
    a first bellows element which is mounted on a first side of the support and is arranged to be exposed to a second fluid; and
    a second bellows element which is mounted on a second side of the support and is arranged to be exposed to the first fluid,
    wherein the first bellows element and the second bellows element are filled with an incompressible fluid and are interconnected via the support, and wherein the second bellows element is connected to the valve body allowing the position of the valve body relative the valve seat to be controlled by a pressure differential between the first fluid and the second fluid.

2. The valve device according to claim 1, characterised in that the first bellows element is circumscribed at one end by an attachment means and at the opposite end by an impact element, thereby forming a cavity.

3. The valve device according to claim 1, characterised in that the support internally in the internal longitudinal passage secures the first and second bellows elements against radial movement, where the support will further restrict movement of the first and second bellows elements respectively in the valve device's axial direction.

4. The valve device according to claim 1, characterised in that the support comprises a closed cylinder, where the cylinder's top and bottom surfaces are provided with a hole for passing through the first and the second bellows elements.

5. The valve device according to claim 4, characterised in that top and bottom plates of the support restrict the axial movement of the pressure-sensitive device.

6. The valve device according to claim 1, characterised in that a guide element is provided with a through-going hole for receiving a connecting rod.

7. The valve device according to claim 1, characterised in that a pre-tensioning device which is arranged round the first and second bellows elements comprises a nitrogen pack or springs.

8. The valve device according to claim 1, characterised in that each of the first and the second bellows elements is connected to an impact element, which impact element is mounted in the support.

9. The valve device according to claim 8, characterised in that the impact element is sealingly mounted in the support.

10. The valve device according to claim 8, characterised in that the impact element is arranged to seal off the support in an upper and lower stop positions respectively of the valve device.

11. The valve device according to claim 10, characterised in that in the upper and the lower stop positions respectively, the first and second bellows elements are designed to have a maximum compression.

12. The valve device according to claim 1, characterised in that the valve seat and the valve body when the valve body is brought into abutment with the valve seat form an open connection.

13. The valve device according to claim 1, characterised in that at least one of the bellows element is connected with an activating mechanism.

14. The valve device according to claim 1, characterised in that a sleeve is connected internally in the upper or lower bellows element.

* * * * *